H. W. ELROD.
TRUCK.
APPLICATION FILED AUG. 16, 1917.
1,299,313.
Patented Apr. 1, 1919.
2 SHEETS—SHEET 1.
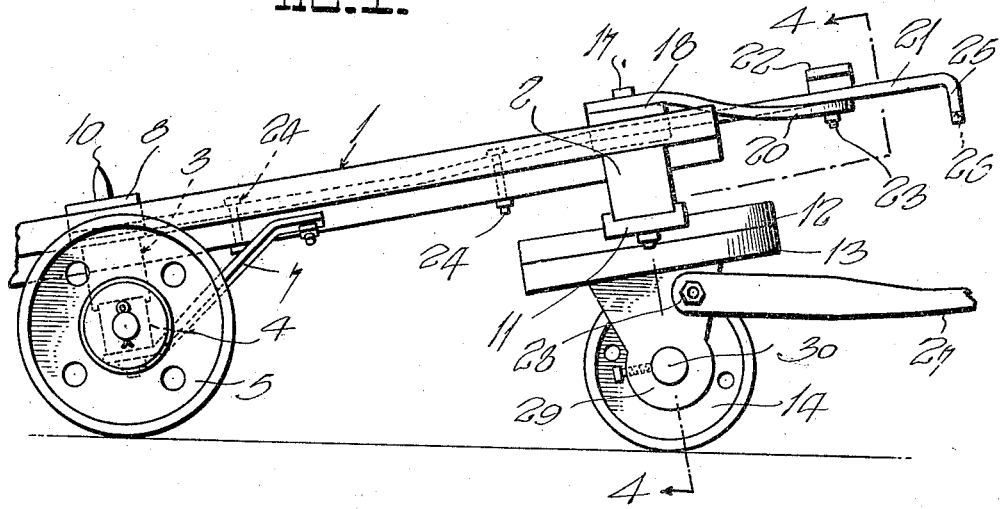
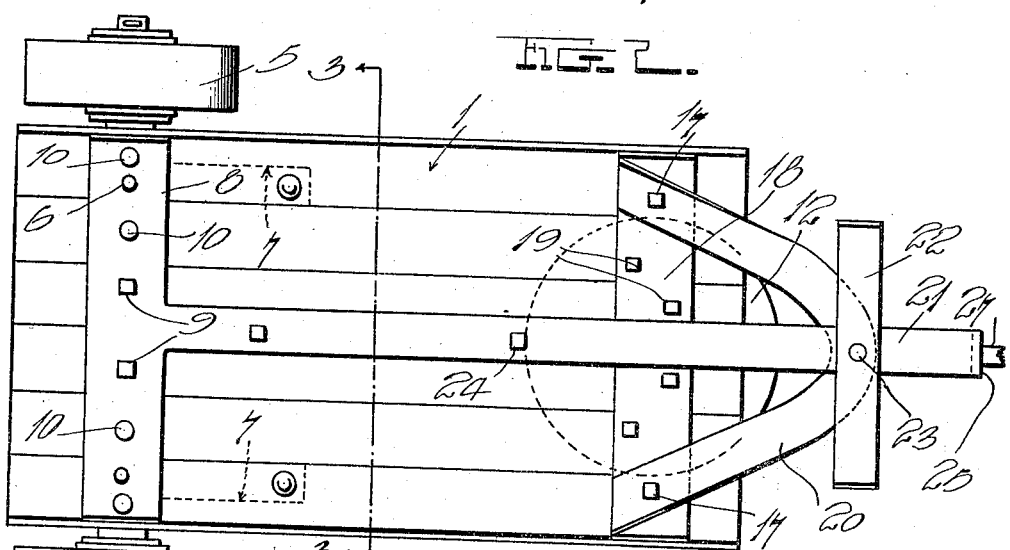
Inventor
H. W. Elrod

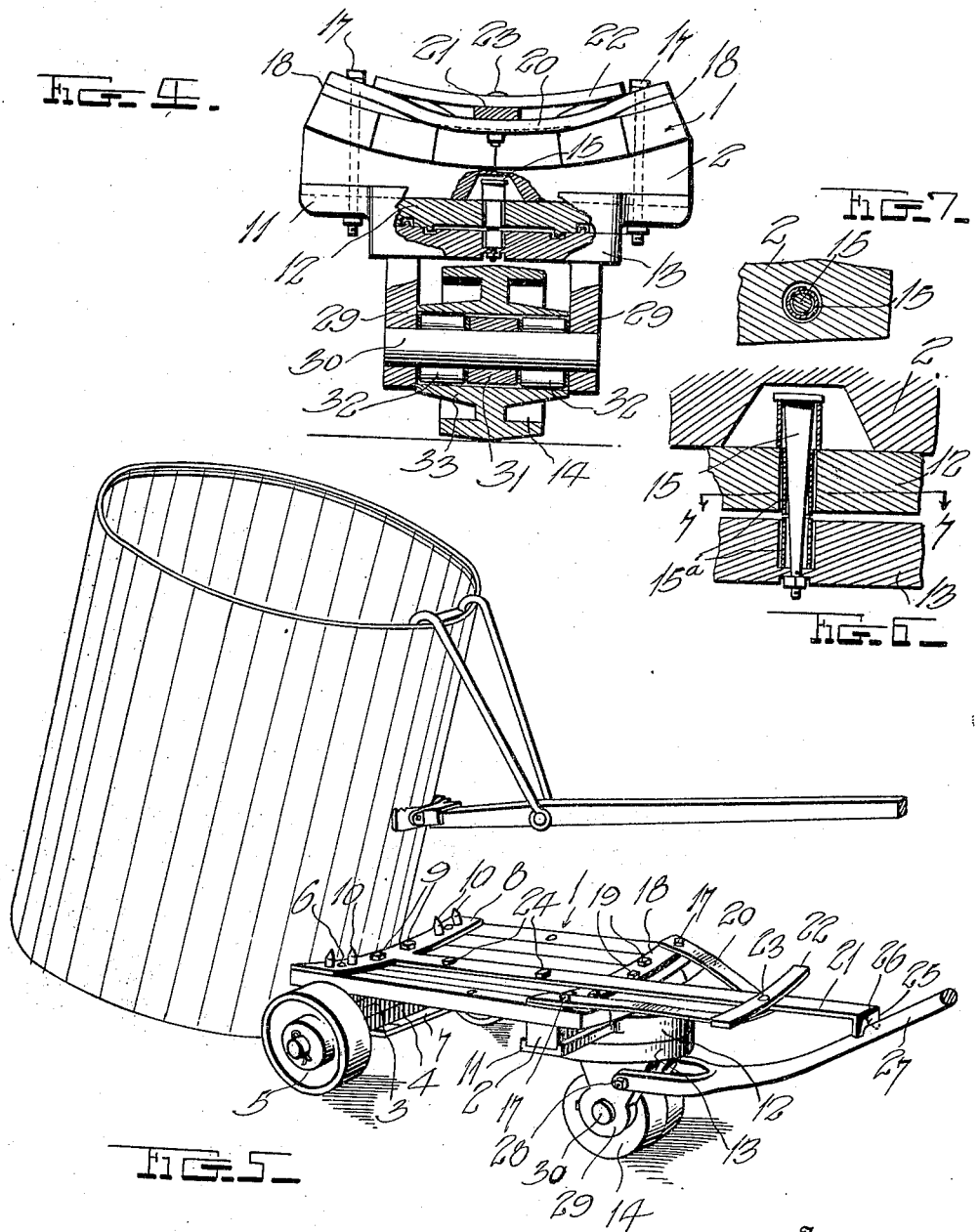

UNITED STATES PATENT OFFICE.

HERMAN WALLACE ELROD, OF NASHVILLE, TENNESSEE.

TRUCK.

1,299,313.  Specification of Letters Patent.  Patented Apr. 1, 1919.

Application filed August 16, 1917. Serial No. 186,628.

*To all whom it may concern:*

Be it known that I, HERMAN W. ELROD, a citizen of the United States, residing at Nashville, in the county of Davidson and State of Tennessee, have invented certain new and useful Improvements in Trucks; and I do declare the following to be a full, clear, and exact description of the invention, such as will enable others skilled in the art to which it appertains to make and use the same.

This invention relates to improvements in trucks especially designed for use in tobacco warehouses and freight houses, wharves, docks, etc., for the handling of tobacco hogsheads, cotton bales and other heavy freight.

One object of the invention is to provide a truck onto which a tobacco hogshead or the like may be readily tilted and will rest in a slightly overbalanced position so that while it may be easily transported, it may be just as readily returned to an upright position.

A further object of the invention is to provide a truck of such construction that it may be readily manipulated to properly position it to receive the hogshead and to also properly position it to discharge the same.

A still further object is to provide a hogshead truck which will be of simple and comparatively inexpensive construction and at the same time be extremely strong and durable so as to stand the heavy strain which it is subjected to.

With the foregoing and other objects in view, the invention consists of certain novel features of construction, and the combination and arrangement of parts as will be more fully described and claimed.

In the accompanying drawings:

Figure 1 is a side elevation of a hogshead truck constructed in accordance with my invention;

Fig. 2 is a top plan view;

Fig. 3 is a transverse section taken on the line 3—3 of Fig. 2;

Fig. 4 is a transverse section taken on the line 4—4 of Fig. 1; and,

Fig. 5 is a perspective view showing the truck ready to receive a hogshead.

Fig. 6 is a detailed sectional view through the shock absorbing king bolt structure; and, Fig. 7 is a horizontal section on line 7—7 of Fig. 6.

The body 1 of the truck is curved transversely to conform to the shape of the side of a hogshead and it is composed of a series of longitudinal boards or beams arranged on front and rear bolsters 2—3. The rear bolster 3 is arranged above an axle 4 having at its ends wheels 5 which are preferably provided with suitable anti-friction bearings. The axle is secured to its bolster by bolts 6 which also pass through the ends of upwardly and forwardly inclined braces 7 which latter have their forward ends secured to the bottom of the body, (see Fig. 1.) The bolts 6 also pass through a rear reinforcing plate 8 arranged across the top of the body at its rear edge and secured in position by additional bolts or screws 9. Rising from the plate 8 are spurs 10, said spurs serving as a fulcrum for the hogshead as it is tilted onto the truck and also preventing it from slipping endwise.

The front bolster 2 is secured at its bottom in a channel-shaped cross bar 11 formed on the upper section 12 of a fifth wheel or turn-table, the lower section 13 of which has mounted in it a single front wheel 14. The two fifth wheel members 12—13 are connected by a shock absorbing fifth wheel structure shown in Figs. 6 and 7. A king bolt 15 extends through steel tubes $15^a$ arranged in the openings in the members 12—13. These steel tubes or cuffs $15^a$ are split lengthwise with their edges overlapped as shown in Fig. 7 to form springs so that the king bolt will be relieved of undue strain when the fifth wheel strikes uneven places or obstructions and also when a sudden weight is thrown upon one side or the other of the truck. The cross bar 11 of the upper turn-table section is securely fastened in position by bolts 17 which pass upwardly through the bolster, the body boards and a front transversely arranged reinforcing plate 18 arranged on the upper side of the body and secured to the same by screws or other fastenings 19.

The bolts 17 also pass through a substantially U shaped, forwardly extending resilient brace member or yoke 20 arranged beneath a resilient center bar 21 which extends longitudinally across the plate 18 and from the rear plate 8. The forwardly projecting end of the center bar 21 is thus yieldably supported and braced by the U-shaped resilient brace member 20 and on its upper side is a hogshead supporting cross-piece 22 which is curved longitudinally to substantially conform to the curvature of the hogshead. This cross-piece 22 is secured by a bolt 23 which also serves to fasten the center bar 21 and brace 20 together. The intermediate portion of the center bar is secured to the center of the truck body by suitable fastenings 24 and its front end is downturned to provide an extension or flange 25 having in its bottom edge a notch 26 of sufficient size to receive a pulling and steering handle 27.

The tongue or handle 27 may have a suitable hand piece at its front end and its rear end is forked and pivoted at 28 to the opposite sides of bearing brackets 29 depending from the lower turn-table section 13 in spaced relation. These brackets 29 receive the axle 30 of the front caster wheel 14 and on the center of said axle is fixed a cylindrical bearing member 31 arranged between sets of roller bearings 32 which it spaces apart. These roller bearings are arranged in the ends of the hub 33 of the wheel 14 and said hub is made comparatively long to give a substantial bearing capable of withstanding the shock which it receives when a large hogshead drops upon it. However, to prevent danger of breaking of the bearings, I provide the central bearing member and spacer 31 which has a diameter of about one-sixth of an inch less than the diameter of each of the roller bearing units 32. The periphery of the caster wheel 14 is made with a crown so that it will not catch in being turned and the wheel is also comparatively wide to give a substantial bearing and prevent danger of tilting.

In operation when it is desired to load a hogshead on the truck it is backed up against the side of the hogshead and the latter is then engaged by my improved grapple which is shown in Fig. 5 and which forms the subject matter of another patent application, No. 185,404, filed August 9, 1917, such grapple having its stave clamping jaw engaged with the staves at a suitable point below its upper edge and its hook member engaged over the chime of the barrel. By pressing downwardly on the handle of this device the hogshead can be readily tilted on edge so that its staves will engage the spurs 10 which then serve as a fulcrum. As the hogshead drops over onto the curved or concaved body of the truck it will strike the yieldable cross-piece 22 and settle down in the concaved top of the body where it will be held so that the truck may be readily moved to transport it to the point desired. By having the body of the truck inclined downwardly and rearwardly as shown in Fig. 1, the hogshead when on the truck will be in a slightly overbalanced position so that it may be easily tilted and restored to an upright position when the truck has been moved to the desired location. In positioning the truck preparatory to receiving the hogshead the operator of course manipulates the handle or tongue 27 and by holding said handle in the notch 26 the wheel 14 may be readily steadied by one operator, while another one tilts down the barrel by means of the grapple. When thus holding the handle 27 while the hogshead strikes the bar 22, the part of the resilient bar 21 between the bar 22 and the handle 27 yields and thereby cushions the shock from the handle. The center bar 21 with its extension 25 is of further advantage in positioning the truck ready to receive the hogshead since when the handle 27 is engaged with the notch the front end of the truck may be readily lifted and moved laterally by means of the handle without moving the body back and forth by turning the wheel 14 on its fifth wheel.

The many advantages of the invention will be apparent and it is thought that a lengthy statement is unnecessary. However, it will suffice to say that in practice, the use of the truck enables the saving of one-half of the cost of labor necessary to load and unload hogsheads and obviates the dangers incident to turning and rolling of these heavy pieces of freight. The use of a three-wheel truck obviates the liability of the handle of the truck being knocked out of the hands of the user when an obstruction is encountered and it of course enables the truck to be manipulated in a very small space. It is to be noted that the tongue or handle is so arranged that it may be swung entirely around the circle of the turn-table and can be positioned to the rear between the wheels 5 so that the truck may be readily pulled backward. The inclination of the body of the truck, together with the arrangement of the spurs at the rear end to serve as a fulcrum of the hogshead, and the use of the resilient center bar, cross-piece and brace therefor to cushion the shock of the falling hogshead, renders the truck exceedingly effective for handling tobacco hogsheads and these features, together with the design of the fifth wheel or turn-table renders the truck exceedingly practical and efficient and durable for the purpose specified.

Various changes in the form, proportion and the minor details of construction may be resorted to without departing from the principle or sacrificing any of the advantages of the claimed invention.

I claim:—

1. In a truck, the combination of a body, rear wheels supporting the rear end of said body, a fifth wheel secured to the front part of the body, a front wheel pivotally connected to said fifth wheel, a handle pivotally connected to said fifth wheel and operable to turn the latter and a bar secured to the front end portion of said body and extending forward and rearward beyond the front end of the body, the front end of said bar being provided with a depending flange having a downwardly facing notch adapted to engage with said handle, whereby the said bar and handle are coöperative to lift the front of the truck and turn the truck on its rear wheels while preventing the turning of said fifth wheel.

2. In a truck, the combination of a body, rear wheels supporting the rear end of said body, a fifth wheel secured to the front part of the body, a front wheel pivotally connected to said fifth wheel, a handle pivotally connected to said fifth wheel and operable to turn the latter, and a resilient bar secured to the front end portion of said body and extending forward and rearward beyond the front end of the body, the front end of said bar being provided with a depending flange having a downwardly facing notch adapted to engage with and be supported by said handle, and an upwardly concaved bar adapted to support one end of the hogshead and secured on and extending transversely of the first said resilient bar at a point between said flange and the front end of said body, whereby the portions of the resilient bar between the transversely extending bar and the handle will cushion the shock from the handle.

3. In a truck, the combination of a body, rear wheels supporting the rear end of said body, a fifth wheel secured to the front part of the body, a front wheel pivotally connected to said fifth wheel, a handle pivotally connected to said fifth wheel and operable to turn the latter, and a bar secured to the front end portion of said body and extending forward and rearward beyond the front end of the body, the front end of said bar being provided with a depending flange having a downwardly facing notch adapted to engage with said handle, a resilient U-shaped yoke having its ends rigidly secured to said body and having its middle part extending forwardly of said body and secured to said bar between its ends, and a load-supporting member extending transversely of the said bar and secured thereto at the junction of said bar and said yoke, the first said bar being resilient and coöperative with said handle and yoke to limit the yielding of said load-supporting member under the impact of a load being placed thereon.

4. A truck comprising a body, rear supporting wheels therefor, a fifth wheel structure at the front end of the body including upper and lower sections having pivot openings, a king bolt extending through said pivot openings, shock-absorbing tubes in said pivot openings and around the king bolt, and a front supporting wheel mounted on the lower section of the fifth wheel.

In testimony whereof I have hereunto set my hand in the presence of two subscribing witnesses.

HERMAN WALLACE ELROD.

Witnesses:
J. C. BRADFORD,
WITHERSPOON W. HAYS.